June 25, 1968 W. J. ROANTREE 3,389,615
VARIABLE SPEED SPIRAL GEARING MECHANISM
Filed Sept. 20, 1967 2 Sheets-Sheet 1
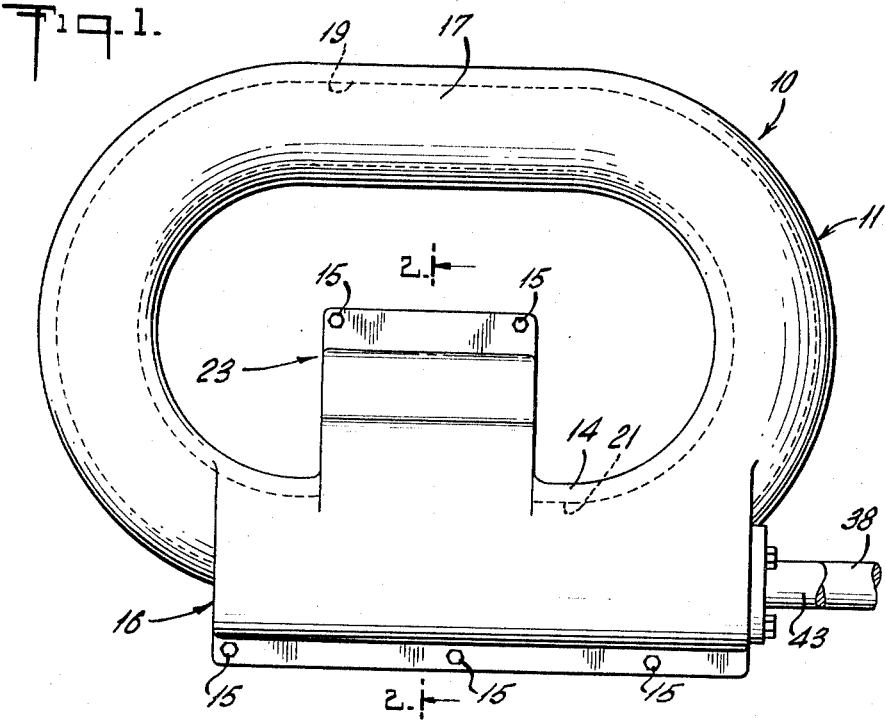
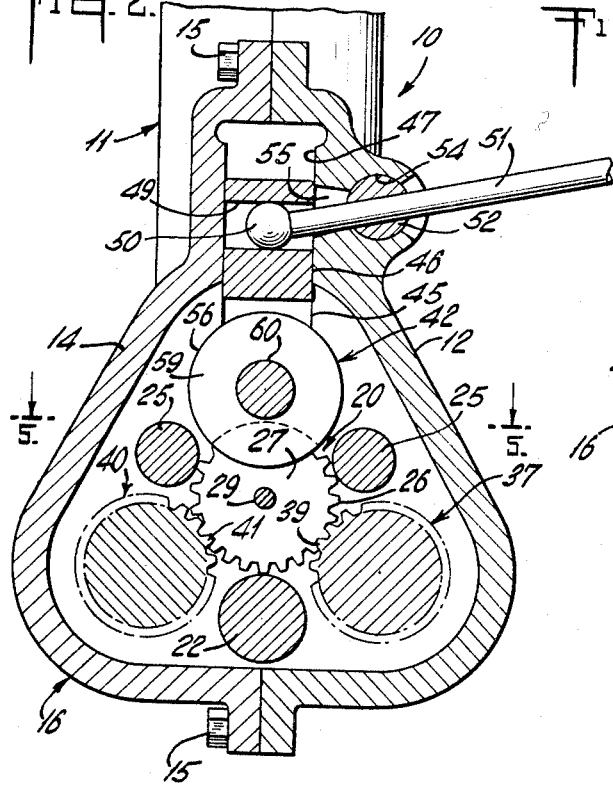
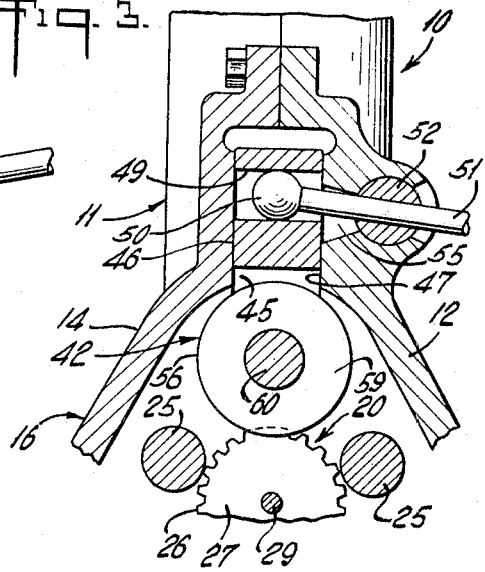
INVENTOR
WILLIAM J. ROANTREE
BY Albert M. Parker
ATTORNEY

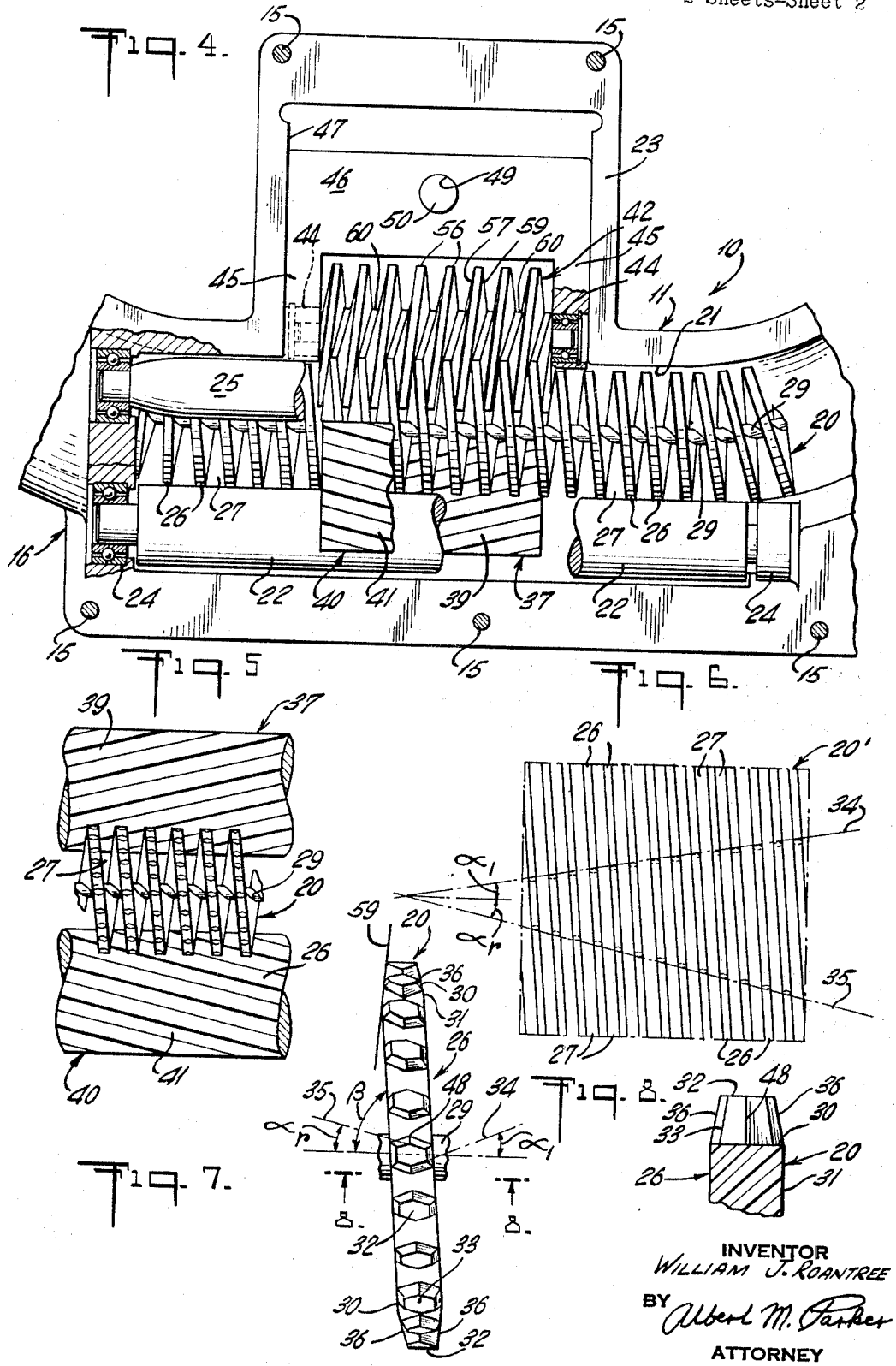

United States Patent Office 3,389,615
Patented June 25, 1968

3,389,615
VARIABLE SPEED SPIRAL GEARING MECHANISM
William J. Roantree, Port Washington, N.Y., assignor to Roantree Electro-Mech Corporation, Port Washington, N.Y., a corporation of New York
Filed Sept. 20, 1967, Ser. No. 669,229
11 Claims. (Cl. 74—424.7)

ABSTRACT OF THE DISCLOSURE

An infinitely variable speed rotary gearing mechanism of the differential type. An intermediate gear means has two sets of helical gear teeth of opposite hand thereon. One set of the gear teeth on the intermediate gear means mesh with helical gear teeth on an input gear and the other set of the gear teeth on the intermediate gear means mesh with an output gear disposed at a driving zone of the mechanism. The output gear is thus positively geared to the input gear through the intermediate gear means, which rotates about its longitudinal axis. Longitudinal movement of the intermediate gear means changes the angular relationship between the input and output gears.

Cross references to related applications

The present application is related to applicant's prior pending application Ser. No. 614,339, filed Feb. 6, 1967, wherein there is disclosed and claimed a differential gearing mechanism for converting rotary to linear motion. The present application is related to applicant's application Ser. No. 632,769, filed Apr. 21, 1967, wherein there is disclosed and claimed a variable speed differential gearing mechanism for converting rotary to linear motion.

Background of the invention

*Field of the invention.*—The invention relates to an infinitely variable speed rotary gearing mechanism which, in the disclosed embodiment, converts rotary motion to rotary motion at approximately the same input and output speeds.

*Description of the prior art.*—Prior art infinitely variable speed changing mechanisms include those having two pulleys which are connected by a belt of constant length, the pulleys being of such construction and being connected by a linkage such that their effective driving diameters are changed inversely. The accuracy of control of output speed obtainable with such mechanism leaves much to be desired, however, because the drive is wholly frictional in character.

The infinitely variable gearing mechanism of the present invention provides a gear train which is continuous from the input to the output thereof. The variation of the speed of the output shaft is substantially positive, being effected by changing the speed of longitudinal travel of the intermediate gear means relative to the speed of rotation of such intermediate gear means about its axis. The gearing mechanism of the invention may thus be adjusted so as accurately to deliver a desired output speed.

Summary of the invention

The gearing mechanism of the invention in the illustrated preferred embodiment thereof changes the speed of rotary motion transmitted therethrough by a differential action. The mechanism has two main parts, of which the first is an idle screw threaded differential roller and the second of which includes a flexible endless intermediate gear member having a screw thread thereon. The thread on the differential roller meshes with and drivingly engages a part of the thread on the flexible intermediate gear member at a driving zone; the flexible intermediate gear member is mounted for movement along its length through said driving zone. The flexible intermediate gear member, which is also rotatable about its longitudinal axis, moves in the direction of its length at a speed which is a function of the ratio of the diameters of the zones of driving engagement of the screw threads on the differential roller and the flexible intermediate gear member. The speed of travel or the effective lead ($L_e$) of the flexible intermediate gear member is derived from the following general equation:

$$L_e = L_L + \frac{D_L}{D_R} L_R$$

where $L_L$ = lead of the flexible intermediate gear member (+ for R.H., − for L.H.);
$L_R$ = lead of the differential roller (+ for R.H., − for L.H.);
$D_L$ = diameter of the driving surface of the flexible gear member; and
$D_R$ = diameter of the driven surface of the differential roller.

The ratio between the angular speed of the flexible intermediate gear member and that of the output shaft is varied by altering the ratio $D_L/D_R$ in the above equation.

In the embodiment of the gearing mechanism shown herein, the screw threads on the flexible intermediate gear member and on the differential roller are of the same pitch but opposite hand.

In the disclosed embodiment of the gearing mechanism, the differential roller is selectively adjusted toward and away from the portion of the flexible intermediate gear member lying in the driving zone of the gearing mechanism; the value of $D_L$ remains constant but the value of $D_R$ varies during such adjustment, whereby to vary the value of the ratio $D_L/D_R$.

Brief description of the drawing

In the drawings, wherein like reference characters refer to like parts throughout the several views, FIG. 1 is a view in side elevation of a preferred embodiment of the variable gearing mechanism in accordance with the invention;

FIG. 2 is a fragmentary view in vertical section through the lower portion of the mechanism shown in FIG. 1, the section being taken along the line 2—2 of FIG. 1, the differential roller being shown adjusted downwardly to a position adjacent its lower terminal position;

FIG. 3 is a fragmentary view in vertical section of the mechanism similar to FIG. 2 but with the adjustable differential roller lying adjacent its upper terminal position;

FIG. 4 is a fragmentary view in vertical longitudinal section through the mechanism, certain of the parts being shown in elevation;

FIG. 5 is a fragmentary view in horizontal section showing a portion of the flexible intermediate gear in its driving engagement with the portions of the input and output gears of the gearing mechanism, the section being taken generally along the line 5—5 of FIG. 2 looking in the direction of the arrows;

FIG. 6 is a somewhat schematic view in plan of a fragment of the flexible intermediate gear, such figure particularly showing the manner of formation of the gear teeth on the periphery of the turns of the land of the flexible intermediate gear member;

FIG. 7 is an enlarged view in plan of a portion of the flexible intermediate gear member, the figure showing the teeth on the lands of such flexible intermediate gear member in greater detail and also illustrating the manner of engagement between such land and a flank of the land of the differential roller; and FIG. 8 is an enlarged fragmentary view in radial section through a land of the flexible recirculating intermediate gear, the section being taken along the line 8—8 looking in the direction of the arrows in FIG. 7.

Description of the preferred embodiment

Turning now to the drawings, the preferred embodiment of variable gearing mechanism in accordance with the invention is designated generally by the reference character 10. Such mechanism has a housing 11 which, as evident in FIGS. 3 and 4, is made up of two generally similar facing parts. The right-hand part of the housing (FIG. 2) is designated 12 and the left-hand part thereof is designated 14. Housing parts 12 and 14 are held together by a plurality of machine screws 15 spaced along peripheral abutting flanges of the two parts of the housing.

The housing of the gearing mechanism has a lower base portion 16 and an upper hollow portion 17 which is generally of horizontal C-shape. The inner surface 19 of housing portion 17 functions as a guide for the flexible continuous intermediate gear member 20 which circulates therethrough. In its lower portion the inner wall of the housing defines a straight channel 21; channel 21 contains the driving zone through which the flexible intermediate gear member 20 passes. Within such lower portion 16 of the housing and spanning the driving zone therein there is disposed a horizontal lower roller 22, the axis of which lies laterally centrally of the housing. Roller 22 is journalled in the housing at its opposite ends in bearings 24, as shown in FIG. 4. Communicating with the straight portion 21 of the channel within the housing is an upstanding portion 23 of the housing within which there is mounted adjustable supporting means for a differential roller 42, to be described. At each side of the differential roller there are positioned further upper horizontally extending idle rolls 25 on each side of the portion of the intermediate gear member 20 disposed within the said driving zone. Rolls 25, which are journalled in the housing as indicated in FIG. 4, together with the lower guide roll 22, accurately locate the portion of the intermediate gear member 20 in the straight portion 21 of the channel within the housing for straight line movement therethrough.

The intermediate gear member 20, as shown in FIG. 4, has a radially deep continuous helical land 26 having radially extending parallel flanks 31, the successive turns of the land being separated by a helical groove 27. The intermediate gear member 20 has a central or root portion 29 which is sufficiently flexible to permit the intermediate gear member 20 to travel freely within the described guide channel in the housing. During such travel of the gear member 20 through such guiding channel in the housing, such member 20 is continually turned about its longitudinal axis. The rate of longitudinal or linear travel of the gear member 20 is determined by its manner of cooperation with the differential roller 42, to be described.

The flexible intermediate gear member 20, which has double-cut gear teeth 33 on the outer edges of its land 26, functions as one of a plurality of serially connected gears in a gear train including helical input and output gears 37 and 40, respectively. Gear 37, which is fixedly mounted on input shaft 38, is shown as being a left-hand gear, and gear 40, which is fixedly mounted on output shaft 43, is shown as being a right-hand gear. Such input and output gears 37, 40, and the double-cut gear teeth 33 on the land 26 of the intermediate gear member 20 which mesh with gears 37 and 40, are of such configuration and have such relationship, as explained below, that variation of the rate of longitudinal travel of the intermediate gear member 20 changes the effective angular speed of motion transmitted through the drive train from gear 37 to gear 40.

The configuration of the portions of the land 26 of the intermediate gear member 20 which drivingly engage flanks of the turns of the land of the differential roller, and the manner of cooperation between the intermediate gear member 20 and the input and output gears 37 and 40 will be more readily understood upon consideration of FIGS. 5–8, inclusive. As shown in FIGS. 7 and 8, each side of the land 26 is provided with a smooth flank 31 which terminates at its radially outer edge in a shoulder having an annular edge 30. Radially outwardly of such shoulders, the outer edges of the lands 26 are cut angularly or chamfered at 36 so that on each side such radially outer portion of the land is relieved from contact with the confronting flank of the differential roller, shown as a line 59 in FIG. 7. The flexible intermediate gear member 20 may be formed by first cutting a bar of material such as metal to form a helical groove therein, the surfaces of the groove defining the helical land 26. The peripheral edge of each axial portion of the thus formed land 26 is then in the form of a short circular cylindrical surface coaxial of the root 29 of the intermediate gear member 20. After being thus formed by the first cutting operation, the gear member 20 is double-cut, that is, cut in opposite directions of inclination with respect to the longitudinal axis of gear member 20, to provide a plurality of radially projecting gear teeth 33 on the lands 26.

The gear teeth 33 are formed by subjecting the lands of the first cut gear member blank 20' to a series of parallel cuts first along one of the paths 34, 35 shown in FIG. 6 and then subjecting the initially cut intermediate gear member to a series of parallel cuts extending along the other of such paths. When the paths 34 and 35 are disposed angularly relative to each other and to the axis of the gear member 20 in the manner indicated generally below, there result the double-cut gear teeth 33 which are generally symmetrical end for end in an axial direction. Each of teeth 33 has oppositely inclined surfaces meeting in a generally central radial line which is designated 48 in FIGS. 7 and 8, and part-cylindrical outer ends 32 (FIGS. 7 and 8).

There are several important criteria in the design of the gear member 20 and the gears 37 and 40 in order that the gears shall be of maximum strength and operate most smoothly. The most important requirement for the design of the teeth 33 on the intermediate gear member 20 is that the crests of all three helical cuts on such gear shall coincide. This insures that the maximum number of teeth 33 on gear member 20 are available to contact the teeth 39 and 41 on gears 37 and 40, respectively. It is also important to smooth operation that the coincident crests are staggered around the gear member 20 so that a true rolling surface is presented to the guide rollers 22 and 25.

The angle of the first thread-like cut on the gear member 20 establishes the pitch of the linear motion portion of the system. This angle, which is measured from the longitudinal axis of the gear member 20, is designated $\beta$. This angle must be chosen so that the difference between it and 90° is less than the angle of repose for the gear materials in contact at this point. The relation between this angle and the other design criteria of the gear is:

$$\beta = \text{Arc Tan} \frac{P}{\pi D_{pi}}$$

where $P=$ the pitch of the thread-like cut on gear member 20, and $D_{pi}=$ the diameter of the edge 30 of gear member 20.

The surfaces of gear teeth 33 resulting from the left-hand helical gear cut on gear member 20 mate with the right-hand helical output gear 40. The helix angle $\alpha_1$ of this cut is chosen so that the top lands of the gear teeth 33 are staggered around the gear so that a continuous rolling surface is presented to the support rollers 22 and 25. The relationship is:

$$\alpha_1 = \text{Arc Tan} \frac{CP}{nP}$$

where $CP$ = the circular pitch of the helical gear form, and
$n$ = the smallest integer which when multiplied by the top land width is greater than the circular pitch.

The surfaces of gear teeth 33 resulting from the right-hand helical gear cut on gear member 20 mate with the left-hand helical input gear 37. The helix angle $\alpha_r$ of this cut is chosen so that all the crests of each cut coincide in accordance with the principal operating criteria mentioned above. This angle, $\alpha_r$, is calculated from the previous design criteria in the following manner:

$$\alpha_r = \frac{X \sin \beta}{P + X \cos \beta}$$

where $$X = \frac{CP \cos \alpha_1}{\sin (\alpha_1 + \beta)} \times \left(1 - \frac{1}{n}\right)$$

The design criteria used in a preferred embodiment of the depicted device are summarized below:

| Chosen Values | Calculated Values |
|---|---|
| $N=24$ | $n=3$ |
| $DP=16$ | $\alpha_1=9°54'$ |
| $\beta=85°15'$ | $\alpha_r=18°50'$ |
| $D_P=1.5''$ | $P=.375''$ |

The double-cut gear teeth 33 on gear member 20 mesh with the helical teeth 39 on the input gear 37 and with the helical teeth 41 on the output gear 40. The teeth 39, in the example given, have a helical angle of $\alpha_1=9°54'$, and the teeth 41 have a helical angle of $\alpha_R=18°50'$. As shown, the input gear 37 is disposed generally below and to one side of the gear member 20, and the output gear 40 is similarly disposed relative to gear member 20 but on the other side thereof. The input shaft 38 which carries gear 37 is journalled in suitable bearings in portion 16 of the housing, as shown in FIG. 1. The output shaft 43 which carries gear 40 is similarly journalled in portion 16 of the housing parallel with shaft 38. It will thus be apparent that when the input gear 37 is driven by the shaft 38 the engagement of the teeth 39 on gear 37 and teeth 33 on gear member 20 causes gear member 20 to rotate about its axis. The rotation of gear member 20 about its axis in turn, through the interaction of the teeth 33 on gear member 20 and the teeth 41 on gear 40, causes the gear 40 to rotate about its axis and thus to drive the output shaft 43.

If the gear member 20 were held from travel along its longitudinal axis, the ratio between the angular speeds of the gears 37 and 40 would remain a constant. However, because the teeth on the gears 37 and 40 are disposed at helical angles which are opposite as regards their axial planes, and the values of such helical angles are different, the described longitudinal travel of the gear member 20 causes the angular relationship between gears 37 and 40 progressively to change. The rate of such change with a given speed of longitudinal travel of gear member 20 depends upon the sum of the helical angles of the teeth 39 and 41 on the gears 37 and 40, respectively, and on the relative diameters of such gears. These factors for a specific gearing mechanism are ordinarily fixed. In the mechanism shown the ratio of output to input speed is changed by varying the speed of longitudinal travel of the gear member 20 relative to its speed of rotation about its axis. In the illustrative embodiment of the apparatus this is done in the following manner:

In the portion 23 of the housing 11 there is a vertical guideway 47 within which there is reciprocably mounted a vertically adjustable control block 46. As shown in FIG. 4, the control block 46 is provided at its opposite ends with spaced parallel depending arms 45. The differential roller 42 is journalled in bearings 44 mounted in the arms 45. Vertical adjustment of the block 46 thus serves to vary the distance between the axis of the differential roller 42 and the axis of the portion of the gear member 20 which is disposed in the straight or driving zone 21 of the guiding means therefor in the housing. A simple somewhat schematically shown means for adjusting the block 46 incorporates a first class lever 51 pivotally mounted intermediate its length by means of a rocker bearing 52 which is received within a seat 54 in the portion 12 of the housing. Communicating with the seat 54 are inner and outer slot portions in the housing wall, such slot portions being flared at 55 as shown, whereby to permit appreciable rocking of the lever 51. The inner end of the lever is provided with a ball 50 which is received within a cross bore 49 in the block 46. Means (not shown) may be provided for retaining the lever 51 in a desired angularly adjusted position whereby to locate the block 46 and the differential roller 42 at the desired heights.

The differential roller is provided with a thread of modified Acme shape, such thread being of the same pitch but opposite hand from that of the lands 26 of the flexible intermediate gear member 20. The thread of the differential roller 42 has radially deep lands 56 separated by grooves having root surfaces 60. In the embodiment shown, driving engagement between the lands 26 of the gear member 20 and the lands 56 of the differential roller takes place between the radially outer edge 30 of the flank of the lands 26 and one of the flanks 57, 59 of the lands of the differential roller. The particular flank of the lands on the differential roller which the annular edge 30 on the lands of the gear member 20 engages is determined by the direction of drive through the gearing mechanism. In other words, although the gear 37 has been called the input gear and the gear 40 has been called the output gear, in fact the relationship of such gears may be reversed, thereby causing the described reversal of driving engagement between the differential roller and the flexible intermediate gear member 20.

By changing the position of lever 51 the overall speed ratio of the mechanism can be changed. This follows from the variation of the speed of longitudinal travel of the flexible intermediate gear member 20 resulting from the change of the diameter $D_R$ of contact between the edge 30 and the flank of the land of the differential roller which it engages.

The intermediate gear member 20 of the illustrated preferred embodiment is in the form of a flexible endless helicoid having two sets of oppositely inclined gear teeth formed by interacting crossing grooves in the radially outer edge of its land. In accordance with broader aspects of the invention, however, the gear means need not be endless, or flexible, since it may be in the form of one or more rigid or substantially rigid discrete gear means which move longitudinally through the driving zone of the mechanism in meshing, driving relationship with the helical input and output gears. Further, the gear means, instead of having a single gear with two sets of intersecting, crossing helical teeth thereon, may include, for example, two similar parallel gears which are drivingly connected for synchronous rotation and which travel as a unit through the driving zone with respect to the input and output gears. In such construction, one of the two sets of helical gear teeth are on one of said gears of the gear means and mesh with the input gear, whereas the other of the two sets of helical gear teeth are on the other of said gears of the gear means and mesh with the output gear.

Although only one embodiment of the invention has been illustrated in the accompanying drawings and specifically described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:
1. A gearing mechanism for converting rotary motion to rotary motion, comprising a frame, a first, input gear journalled on the frame for rotation with respect thereto, an intermediate gear means mounted for rotation with respect to the frame, the intermediate gear means being provided with two sets of gear teeth formed by two oppositely inclined sets of parallel helical grooves disposed at different shallow angles with respect to the axis of the intermediate gear means, said input gear having helical teeth meshing with a first set of helical gear teeth on the intermediate gear means, means for driving said input gear, an output shaft journalled on the frame, and a second, output gear drivingly connected to the output shaft, said output gear having helical teeth meshing with the other, second set of helical gear teeth on the intermediate gear means, whereby driving of the input gear rotates the intermediate gear means and the intermediate gear means in turn drives the output gear, and means for moving the intermediate gear means along its axis with respect to the input and output gears, whereby to produce a predetermined angular displacement between the input and output gears which is a function of such axial movement of the intermediate gear means.

2. A gearing mechanism as claimed in claim 1, wherein the intermediate gear means is of substantial length, and the means for moving the intermediate gear means along its axis moves such gear means at a controlled predetermined rate, whereby to produce a predetermined rate of angular displacement between the input and output gears which is a function of such axial movement of the intermediate gear means.

3. A gearing mechanism as claimed in claim 2, wherein the intermediate gear means is endless and moves continuously along its axis, whereby the said angular displacement between input and output gear is continuous.

4. A gearing mechanism as claimed in claim 1, wherein the intermediate gear means is a single intermediate gear, and said two sets of gear teeth are formed by two oppositely inclined sets of parallel grooves on the outer surfaces of said single intermediate gear.

5. A gearing mechanism as claimed in claim 4, wherein the intermediate gear has axially spaced lands and grooves, the two sets of gear teeth on the intermediate gear are disposed on the outer surfaces of the lands, and the means for moving the intermediate gear along its axis comprises means drivingly engaging the lands on the intermediate gear.

6. A gearing mechanism as claimed in claim 5, wherein the lands and grooves on the intermediate gear are helical and form a screw thread on the intermediate gear, and the means for moving the intermediate gear along its axis comprises a screw threaded differential roller mounted on the frame generally parallel to a portion of the intermediate gear, means mounting the roller for rotation about its axis but restraining it from axial movement with respect to the frame, the thread on the differential roller being of substantially the same pitch as but of opposite hand from the pitch of the thread on the intermediate gear, the screw threads on the differential roller and the intermediate gear being drivingly engaged in meshing relationship with the lands on one of said members disposed within the grooves on the other of said members.

7. A gearing mechanism as claimed in claim 6, wherein the mechanism is variable, and comprising means to vary the ratio between the radii of the zone of driving engagement of said two members, whereby to vary the rate of movement of the intermediate gear along its axis.

8. A mechanism as claimed in claim 7, wherein zones of continuous helicoidal surfaces adjacent the outer surfaces of the lands of the thread on one member drivingly engage corresponding zones of the confronting sides of the lands on the other member at locations spaced radially outwardly from the roots of the grooves of the thread on said other member.

9. A gearing mechanism as claimed in claim 6, wherein the intermediate gear is in the form of a flexible continuous helicoid, said frame comprising means for guiding the helicoid for travel along its longitudinal axis.

10. A gearing mechanism as claimed in claim 9, wherein said guiding means for the helicoid has a zone of substantial length which maintains the portion of the helicord therein with its longitudinal axis substantially straight, the input and output gears are disposed substantially at said zone of the guiding means, and the differential roller is disposed drivingly to engage the portion of the helicoid at said zone of the guiding means.

11. A gearing mechanism as claimed in claim 10, wherein zones of continuous helicoidal surfaces adjacent the outer surfaces of the lands of the helicoid drivingly engage corresponding zones of the confronting sides of the lands on the differential roller at locations spaced radially outwardly from the roots of the grooves of the thread on said differential roller, and comprising means to vary the distance between the longitudinal axis of the helicoid at said zone of the guiding means and the axis of the differential roller, whereby to vary the ratio between the radii of the zone of driving engagement of the helicoid and differential roller.

References Cited
UNITED STATES PATENTS

| | | | |
|---|---|---|---|
| 3,165,007 | 1/1965 | Neubarth | 74—424.8 |
| 3,174,354 | 3/1965 | Kuehnle | 74—424.5 |
| 3,295,385 | 1/1967 | Jenny | 74—424.8 |

FRED C. MATTERN, Jr., *Primary Examiner.*

L. H. GERIN, *Assistant Examiner.*